July 23, 1957  E. O. HALL  2,799,935
MERCURY EXPRESSOR
Filed Oct. 20, 1954  2 Sheets-Sheet 1

INVENTOR.
EXIAL O. HALL
BY
George L. Weed
ATTORNEY.

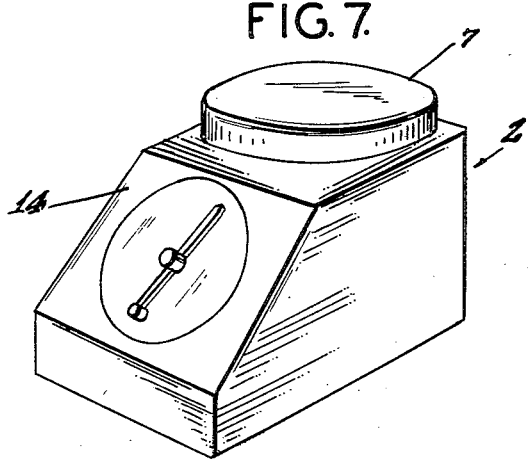
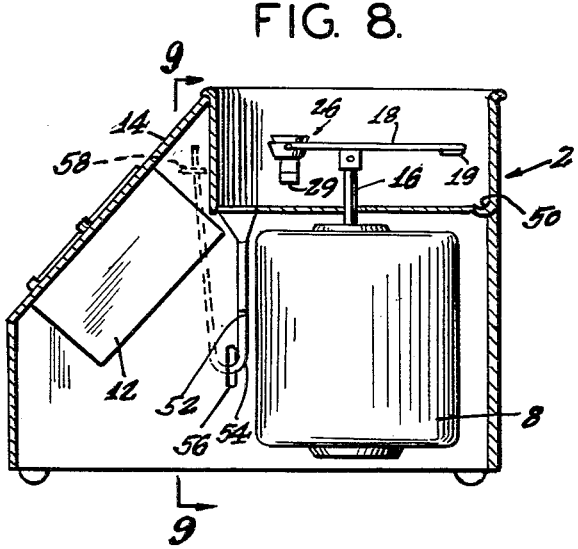
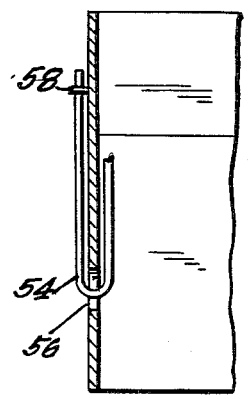

United States Patent Office 2,799,935
Patented July 23, 1957

2,799,935

MERCURY EXPRESSOR

Exial O. Hall, Los Angeles, Calif.

Application October 20, 1954, Serial No. 463,543

8 Claims. (Cl. 32—40)

The present invention relates to a device for properly preparing an amalgam or other mix to a suitable consistency for the use for which it is intended and is primarily, although not necessarily, intended for use in a dental office to obtain an amalgam filling for the restoration of carious teeth.

Heretofore, it has been the custom of the average dentist to prepare his amalgam mix for fillings by properly mixing the silver alloy filings or cuttings with a certain quantity of mercury which is in surplus to form a mix and then place such mix in a cloth and by hand twist the same to extract the excess mercury therefrom to arrive at a suitable consistency which has been a "hit or miss" proposition that could result in a mix either too dry to condense properly within the cavity of a tooth or too moist or slushy for correct manipulation therein.

The principal object of the present invention is the development of a mechanical device to insure the uniform and proper consistency of such a mix, that all guess-work will be removed, and the mix will be in proper condition for condensation to restore the prepared tooth cavity.

Another object of the present invention is a device which with proper and prearranged timing will extract a uniform amount of mercury from the prepared mix by centrifugal force to enable it to always have a desired and uniform consistency.

A still further object of the present invention is the provision of a device of the character described that will be provided with means for insuring the consistency of the mix by stopping the mechanism at any desired time.

Another and still further object of this invention is the provision of such device which will be inexpensive to manufacture, efficient and quiet in operation, economical and accurate in its resultant use.

Other additional objects will appear from the detailed description hereinafter set forth.

In the drawings accompanying and forming a part of this specification—

Fig. 7 is an external view showing a modified design of the exterior.

Fig. 8 is a modification of the interior structure using an open-end cradle.

Fig. 9 is a section on the line 9—9 of Fig. 8.

Similar characters of reference indicate corresponding parts in the several views.

Before explaining in detail the present invention and mode of operation thereof, it is to be understood that the invention is not limited to the details of construction illustrated in the accompanying drawings, since the invention is capable of other embodiments and only the principle thereof and one mode, which has been contemplated, of applying that principle, has been set forth.

Figure 1:
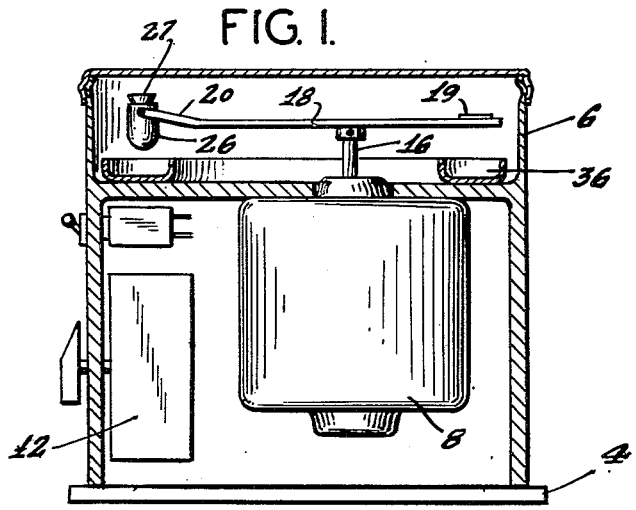
Fig. 1 is a side view of one form of the device partly in section to illustrate the interior.
Figure 2:
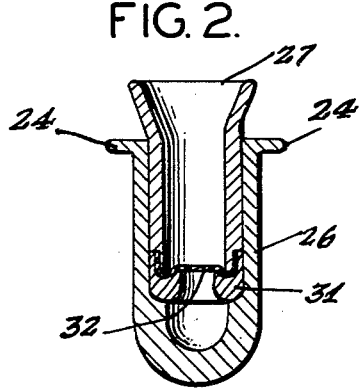
Fig. 2 is a sectional view of the cradle with assembled capsule in place.
Figure 3:
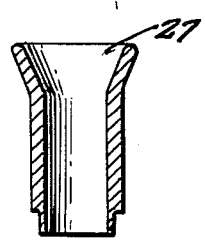
Fig. 3 is a sectional view of the amalgam capsule.
Figure 4:
Fig. 4 is a sectional view of the porous bottom retaining ring.

The present invention comprises a suitable housing of any desired shape such as shown in Fig. 7 or rectangular as shown in Fig. 1 and generally denoted as 2, comprising the usual side, front and rear walls mounted upon a resilient base 4, provided with any desired supporting means such as rubber casters, suction feet or the like. The top of the housing is provided with a suitable guard tray 6 which may have a cover 7 hinged thereto or otherwise suitably secured for permitting ready access to the interior.

Within the housing is located a motor 8 designed to operate at high speed and suitably driven from a power source and this motor is equipped with a standard or conventional braking means intended to brake the motor immediately upon cessation of the driving means.

For limiting or timing the motor operation to accomplish the desired result a timer 12 is provided between the source of power and the motor to cut off the power supply and simultaneously apply the braking means. In the present instance this timer is located within the front face or wall 14 and is provided with any standard setting means on the front face for time-setting.

The motor is provided with the usual drive shaft or rotatable support 16 upon which is mounted a horizontal arm 18 intended for rotation with the shaft and carrying at one end thereof a counter-balance weight 19 to insure even rotation of said arm. The other end of said arm is provided with a bifurcated or yoke-like portion 20 having a pair of oppositely disposed bores or depressions 22 for the reception of trunnions or pins 24 adapted to pivotally support a cradle 26, provided to carry a capsule 27.

This cradle is provided with a recess 28 at the bottom thereof to receive or trap the expelled mercury and at the top thereof with an opening for the reception of the capsule 27. This capsule has a suitable retaining ring 31 adapted to retain a porous bottom or barrier 32 of any desired material. The assembled capsule and ring, when in place, rest upon shoulders 34 of the cradle.

Figure 5:
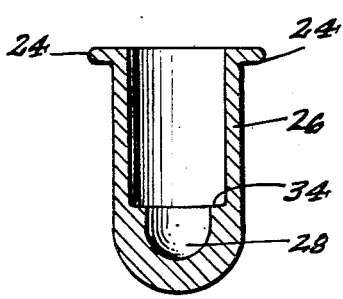
Fig. 5 is a sectional view of the cradle.
Figure 6:
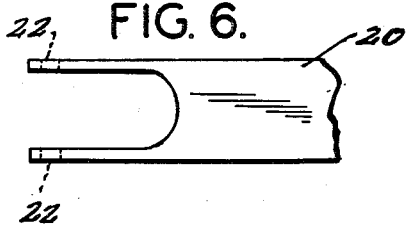
Fig. 6 is a detail view of the cradle supporting fork.

A removable receptacle 36 is provided at any desired location within the housing to receive the expelled mercury from the cradle (Fig. 5) through the simple means of inverting the cradle when over the receptacle.

The operation of the device is as follows:

The silver alloy powder and mercury are proportionately placed in the usual retainer and handmixed as by mortar and pestel or may be mixed in an amalgamator, then placed in the capsule 27 and inserted in cradle 26. The timing mechanism 12 is set according to the desired consistency of the mix and the power turned on to motor 8 which causes rotation of the shaft 12 and arm 18.

The pivoted cradle 26 is swung to a horizontal position and the surplus mercury expelled from the capsule through the porous barrier 32 into the recess 28 of the cradle. When rotation has occurred for a predetermined time according to the time-setting of the timer, the current is stopped and the braking mechanism brings the apparatus to a halt.

The capsule 27 is then removed from the device and the mix is ready for use. The excess mercury expelled may be dumped into receptacle 36 by inversion of cradle 26 and when accumulated may be salvaged.

In the modified form illustrated in Figs. 7 and 8, instead of utilizing a cradle with a closed bottom and recess 28 the cradle 26 has an open bottom 29 adapted to dispel surplus mercury into a circular channel 50 within the housing, which channel tapers to a low section 52 to which the mercury will flow.

This channel 50 at its low section 52 connects with a tube 54 passing through a suitable opening 56 in the side of the housing and is retained at the end thereof in upright position by a clip 58.

In use the operation is the same as heretofore set forth except that the surplus mercury will be collected in channel 50 where it will flow to the low point 52 and may be readily drained off through tube 54 by unclipping the same from clip 58 and lowering the tube to permit ready flow of the mercury into any desired receptacle.

While there has been shown, described and pointed out the fundamental novel features of the invention, it is to be understood that various omissions, substitutions and changes may be made by those skilled in the art in the form and details of the device illustrated and in its operation without departing from the spirit of the invention. It is the intention, therefore, to be limited only as indicated by the scope of the following claims.

I claim:

1. In an apparatus of the character described: a housing, a rotatable support in said housing, an arm carried by said support for rotation therewith, a cradle pivotally carried by said arm and having an open outer end, a capsule in said cradle adapted to contain an amalgam mix, said capsule having a porous barrier therein through which excess mercury can be expelled for passage through the open outer end of said cradle and for discharge into said housing.

2. In an apparatus of the character described: a housing, a rotatable support in said housing, an arm carried by said support for rotation therewith, a cradle pivotally carried by said arm and having an open outer end, a capsule in said cradle adapted to contain an amalgam mix, said capsule having a porous barrier therein through which excess mercury can be expelled for passage through the open outer end of said cradle and for discharge into said housing, and a circumferential collecting channel in said housing for receiving the excess mercury.

3. In an apparatus of the character described: a housing, a rotatable support in said housing, an arm carried by said support for rotation therewith, a cradle member pivotally carried by said arm, a capsule member in said cradle member adapted to contain an amalgam mix, said capsule member having a porous barrier through which excess mercury can be expelled into said cradle member, and a circumferential collecting channel in said housing for receiving the contents of one of said members.

4. In an apparatus of the character described, a housing, a rotatable support in said housing, an arm carried by said support for rotation therewith, a cradle pivotally carried by said arm and having an open outer end, a capsule removably mounted in said cradle and adapted to contain an amalgam mix, said capsule having a porous barrier therein through which excess mercury can be expelled for passage through the open outer end of said cradle and for discharge into said housing, and a circumferential collecting channel in said housing for receiving the excess mercury discharged into said housing.

5. In an apparatus of the character described: a housing having a side wall, a rotatable support in said housing, an arm carried by said support for rotation therewithin, a cradle pivotally carried by said arm and having an open outer end, a capsule in said cradle adapted to contain an amalgam mix, said capsule having a porous barrier therein through which excess mercury can be expelled for passage through the open outer end of said cradle and for discharge into said housing, and a circumferential collecting channel in said housing at the lower portion of said side wall for receiving the excess mercury, and means for withdrawing the excess mercury from said channel.

6. In an apparatus of the character described: a housing, a motor having a generally vertical shaft extending into said housing, an arm secured to said shaft for rotation therewith, a cradle pivotally carried by said arm and having an open outer end, a capsule removably mounted in said cradle and adapted to contain an amalgam mix, said capsule having a porous barrier therein through which excess mercury can be expelled for passage through the open outer end of said cradle and for discharge into said housing.

7. In an apparatus of the character described: a housing having a side wall, a motor having a generally vertical shaft extending into said housing, an arm secured to said shaft for rotation therewith, a cradle pivotally carried by said arm and having an open outer end, a capsule removably mounted in said cradle and adapted to contain an amalgam mix, said capsule having a porous barrier therein through which excess mercury can be expelled for passage through the open outer end of said cradle and for discharge into said housing, a circumferential collecting channel in said housing at the lower portion of said side wall for receiving the excess mercury, and means for withdrawing the excess mercury from said channel.

8. In an apparatus of the character described: a housing, a rotatable support in said housing, an arm carried by said support for rotation therewith, means including a porous barrier carried by said arm against which an amalgam mix is forced and through which excess mercury can be expelled, and a circumferential collecting channel in said housing for receiving the excess mercury expelled through said porous barrier.

References Cited in the file of this patent

UNITED STATES PATENTS

| | | |
|---|---|---|
| 2,006,652 | Phillips | July 2, 1935 |
| 2,147,103 | McKee | Feb. 14, 1939 |
| 2,606,347 | Hildreth | Aug. 12, 1952 |
| 2,665,008 | Call | Jan. 5, 1954 |